April 15, 1930.      M. E. ROE      1,754,438
CASTER
Filed June 13, 1927
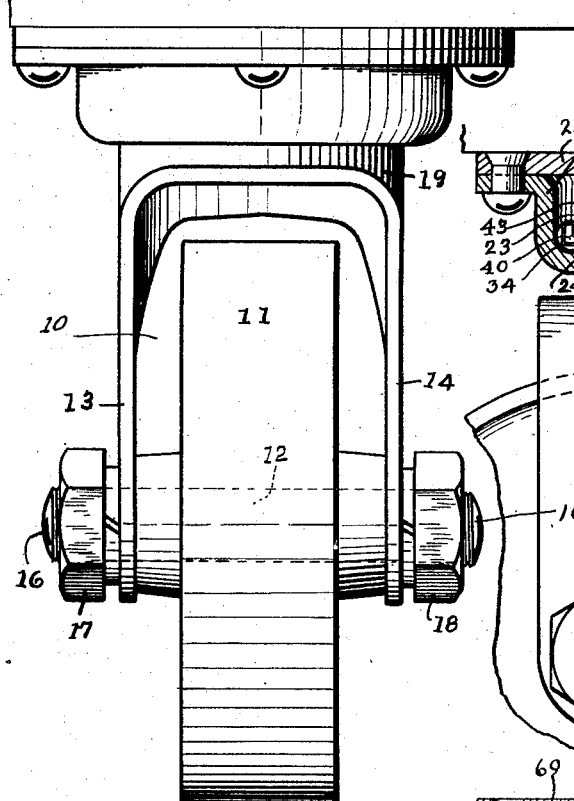
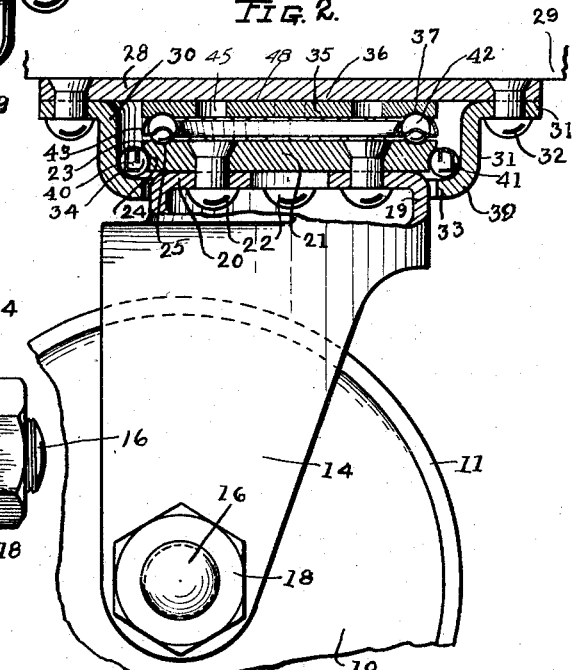
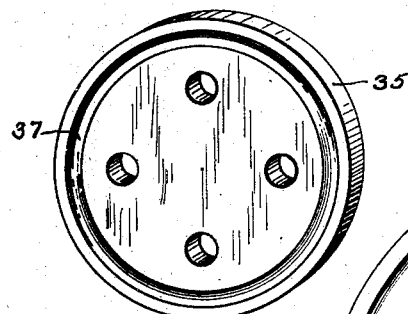
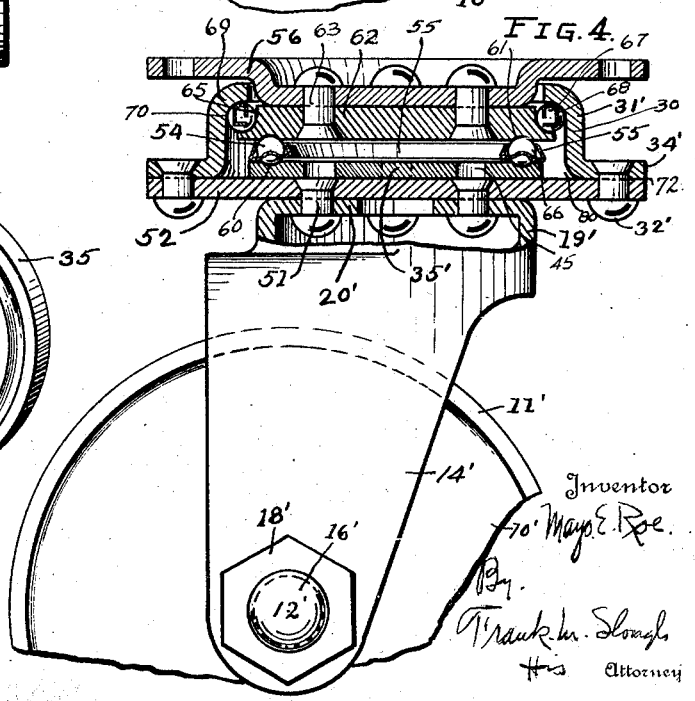

Patented Apr. 15, 1930

1,754,438

UNITED STATES PATENT OFFICE

MAYO E. ROE, OF ELYRIA, OHIO, ASSIGNOR TO THE COLSON COMPANY, OF ELYRIA, OHIO, A CORPORATION OF OHIO

CASTER

Application filed June 13, 1927. Serial No. 198,347.

My invention relates to casters and more particularly it relates to an improved antifrictional swivelable caster.

In caster mechanisms prior to my invention, difficulty has been had in effecting such a proper permanent assembly of the parts whereby most efficient alignment of the bearing surface is had. In order to accomplish a sufficiently accurate axial alignment of the opposed bearing race grooves of caster mechanisms, various expedients have been attempted, but in all of which, so far as I am aware, misalignment often occurs either immediately after assembling the mechanism or occurs subsequently during use of the caster. In those constructions which have been proposed and which insure a reasonably accurate alignment of the opposed surfaces of the opposed grooved bearing race surfaces, the cost of manufacturing the caster bearing mechanisms has been so considerably increased as to be almost prohibitive.

An object, therefore, of my present invention is to provide a caster mechanism wherein accurate alignment of the opposed bearing race grooves will be effected in a structure inexpensive to manufacture.

Another object of my invention is to provide a caster mechanism wherein at all times, even after long periods of heavy use, the opposed bearing race surfaces will swivelably support the load upon the caster wheel in the most precise alignment possible.

Other objects of my invention and the invention itself will become apparent from reference to the following description of embodiments thereof, and in which description reference will be had to accompanying drawings forming a part of this specification.

Referring to the drawings:

Fig. 1 is an end elevational view of an embodiment of my invention;

Fig. 2 is a medial longitudinal sectional view of the same, some portions thereof being shown in elevation;

Fig. 3 is a perspective view of one of the parts comprised in the foregoing embodiment; and Fig. 4 is a longitudinal medial sectional view of another embodiment of my invention, some portions thereof being shown in elevation.

Referring first to the embodiment of my invention illustrated in Figs. 1 to 3, inclusive, wherein like parts are designated by like reference characters, at 10, I show a caster supporting wheel having a rubber tire 11 to render the same quiet in use. The wheel 10 is preferably anti-frictionally journaled on an axle 12, carried in aligned apertures adjacent the lower ends of caster forks 13 and 14, and secured thereon preferably by threading the ends of the axle at 16 for the reception of nuts 17 and 18. The caster forks 13 and 14 are carried by and depend from a caster yoke 19, which yoke is formed with an inturned flange to provide a top plate 20. A ball bearing cone plate 21 is preferably riveted to the top plate 20 by rivets 22 and is disposed on a horizontal plane thereon. The lower peripheral portion 23 of the plate 21 is relieved at 24 to provide an annular race surface and the upper face of the plate 21 is formed with an annular ball race groove 25 disposed in axial relation with the annular surface 24 and intraperipherally disposed thereto.

A load supporting plate 28 providing a backing surface 48 is provided and is adapted to be secured to an article 29 to be supported by the caster in any suitable manner. At 30, I show a depending cylindrical housing or casing having an annular flange 31, secured by rivets 32, to the plate 28, the lower end of the housing being curved inwardly at 39 to provide an annular ball race surface 34 on the inner periphery thereof. The cylindrical housing 30 is adapted to provide a dust proof casing for the friction assemblies of the caster and thus dust and dirt is excluded from the anti-friction assemblies with the result of an efficient operating caster.

A floating thrust member 35 is provided and disposed within the casing 30 with its rear face 36 engaging the backing surface 48 of the plate 28 and having its lower face provided with an annular ball race groove 37, co-axial with the annular ball race groove 25 of the plate 21. Said thrust member is preferably disposed directly above the plate 21 and is free to move laterally on the plate 28.

Interposed between the cone 24 and the race surface 34 of the casing 30, I provide a plurality of anti-friction bearing balls 40, having engagement with the cone and the race portion 34 and being held against relative movement in a ball cage 41. This anti-friction assembly is adapted to permit the caster to swivel about the plate 28 and the casing 30 with a minimum of friction. A plurality of bearing balls 42 are disposed between the annular race grooves 25 and 37, the balls 42 being held against the relative movement by virtue of a race cage 43. The balls 42 are adapted to receive the direct load of the article being supported by the caster and thus insure efficient swiveling of the caster in use.

In the use of the caster, the bearing balls 40 will maintain the plate 21 substantially axial of the race surface 34 on which the balls roll. In manufacturing the device, any variations in relative axial placement of the plate 21 and the supporting plate 28 will, by means of a lateral thrust of the plate 21 on the bearing balls 42, effect a movement of the sliding plate 35 laterally, on the load supporting plate 28 to maintain the relative coaxial alignment of the grooves 25 and 37 and thus an efficient anti-friction bearing for the caster is accomplished. By virtue of this arrangement, the housing having the depending annular flange 31 may be assembled on to the load carrying plate 28 in a quickly operating machine driving the rivets 32 home, and with clearances provided in the aligned openings for the rivets in housing and plate in order to facilitate inexpensive production of the articles in quantity. The floating plate 35 will be shifted then sufficiently to compensate for any variation in axial alignment of the load plate and flanged housing.

The axial position of the plate 21 relative to the housing flange 31 is determined by the load supporting and spacing balls 40, independently of the relative axial alignment of the caster yoke 19 and the housing flange 31.

Referring to Fig. 4 of the drawings, I have illustrated a second embodiment of my invention, which is substantially the reverse, in assembly, of the embodiment of Figs. 1, 2 and 3, and which preferably comprises the employment of a caster wheel 10', anti-frictionally journaled on an axle 12', secured in aligned apertures in the lower end of the fork legs 13' and 14' of a caster yoke 19'. Said axle is held in place by nuts 17' and 18', the upper portion of the yoke being provided with an inturned flange to form a top plate 20' to which is riveted, by rivets 51, a plate 52.

In the present embodiment, I preferably employ a cylindrical housing or casing 30', reversed relative to its position in the foregoing embodiment, in that it extends upwardly from the plate 52, and is provided with an annular flange 31', secured by rivets 32 to the plate 52.

A floating thrust element 35' is provided substantially alike the float thrust element of the foregoing embodiment, except that in the present embodiment I support the same on the upper surface of the plate 52 upon which it may slide laterally in all directions, and thus align the bearing race grooves 60 formed in the top surface of the same, and an opposed race groove 61 formed in the bottom surface of a cone plate 62, said cone plate is riveted by rivets 63 to a caster load supporting plate 56 which may be secured to a supported article, not shown.

A plurality of bearing balls 66 are disposed in the grooves 60 and 61, and held against relative movement by a race cage 55, to provide a direct anti-frictional bearing between the load supporting plate 56 and the caster which receives the direct load to which the caster is subjected and permits the same to swivel with a minimum of friction.

The peripheral portion of the plate 62 is relieved at 65 to form a ball race cone for the reception of a plurality of bearing balls 67, disposed therein and held against relative movement by virtue of a race cage 68. The upper portion of the cylindrical casing 30' is inwardly curved, at 69, and is adapted to provide an opposed race surface 70 upon which the bearing balls 67 engage and thus a second anti-frictional bearing is provided, disposed above the first bearing, and is adapted to permit free swiveling of the caster, regardless of the position to which the caster might be tilted by virtue of lateral stresses imparted to it by the caster wheel.

In the embodiment of my invention illustrated in Fig. 4, I am enabled to place a considerable supply of lubricant in the chamber 80 formed by the casing 31 and thus lubrication of the ball bearings and the plate 35 is accomplished. I may, if necessary, interpose a gasket between the flange 31' and the plate 52 to prevent the loss of lubricant escaping between the joints at 72.

Most of the parts comprising the aforedescribed caster may be formed of pressed steel to insure efficient wearing qualities of the same in use. If desired, the portions of the caster receiving the direct wear may be case hardened.

Apertures 45 are formed in the thrust elements 35 and 35' to collect dirt and the like and to permit efficient shiftable movement of the same. In each embodiment, I contemplate treating the thrust elements with a cyanide hardening process and thus I may increase the durability of the same in use.

The above described caster swivel bearing is more perfect than the prior caster swivel bearings due to the floating thrust plate permitting a perfectly grooved bearing on the top of the thrust balls, which automatically registers perfectly with the top row of balls, and furthermore, this floating plate is free to gradually slip around, presenting a uniform wear in the groove in the top thrust plate.

Having thus described my invention in certain specific embodiments, I am aware that numerous and extensive departures may be made from the embodiments herein illustrated and described without departing from the spirit of my invention.

I claim:

1. In a caster, the combination with a pair of opposite means comprising a swivelable caster wheel supporting caster yoke and a load support, a pair of elements providing opposed co-axially disposed annular grooved bearing races, and bearing balls between the races, one of said elements supported by the yoke, the other of said elements adapted to carry a load, one only of said elements directly engageable with one of said means and being freely shiftable laterally relative thereto, the other of said elements being restrained from free lateral movement relative to that one of said means directly engaging said shiftable element, said elements with their interposed bearing balls being interposed between the yoke and the load to be supported thereon.

2. In a caster, the combination with a pair of opposite means comprising a swivelable caster wheel supporting caster yoke and a load support, a pair of annular elements providing opposed co-axially disposed annular grooved bearing races, and bearing balls between the races, one of said elements supported by the yoke, the other of said elements adapted to carry a load, one only of said elements directly engageable with one of said means and being freely shiftable laterally relative thereto, the other of said elements being restrained from free lateral movement relative to that one of said means directly engaging said shiftable element, said elements with their interposed bearing balls being interposed between the yoke and the load to be supported thereon.

3. In a caster, the combination with a swivelable caster wheel supporting yoke, a load supporting member, a pair of elements providing opposed co-axially disposed annular grooved bearing races and bearing balls interposed between the races, one only of said elements being freely shiftable laterally to insure axial alignment of the races, and means to restrain the other of said elements from lateral movement relative to said yoke and said load support member.

4. In a ball bearing, a pair of relatively rotatable elements, a fixed race plate, a second race plate, bearing balls between the plates, said plates each disposed in engagement with and disposed for rotation with a different one of said rotatable elements, bearing means to prevent lateral movement of the said fixed plate relative to its engaged element and the other of said elements, said second plate mounted for free lateral floating movement on its engaged element, said bearing balls engaging surfaces of both of said plates so disposed relative to the balls as to prevent eccentricity of the plates.

5. In a ball bearing a pair of relatively rotatable elements, a fixed race plate, a second race plate, said plates each disposed in engagement with and disposed for rotation with a different one of said rotatable elements, bearing means to prevent lateral movement of the said fixed plate relative to its engaged element and the other of said elements, said second plate mounted for free lateral floating movement on its engaged element, each of said plates being provided with annular ball bearing receiving grooves adapted for disposition in relative axial alignment, said balls engaging the surfaces of said grooves.

In testimony whereof I hereunto affix my signature this 10th day of June, 1927.

MAYO E. ROE.